(12) United States Patent
Moyne et al.

(10) Patent No.: US 7,979,380 B2
(45) Date of Patent: Jul. 12, 2011

(54) DYNAMICALLY UPDATED PREDICTIVE MODEL

(75) Inventors: James Moyne, Canton, MI (US); Richard Stafford, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 638 days.

(21) Appl. No.: 12/072,010

(22) Filed: Feb. 22, 2008

(65) Prior Publication Data
US 2009/0216348 A1 Aug. 27, 2009

(51) Int. Cl.
*G06F 15/00* (2006.01)
(52) U.S. Cl. ............... 706/62; 706/45; 706/46; 706/47; 706/48; 706/52; 706/55; 706/61; 700/28; 700/29; 700/30; 700/31; 700/32; 700/47
(58) Field of Classification Search .................. None
See application file for complete search history.

(56) References Cited

U.S. PATENT DOCUMENTS

| | | | | |
|---|---|---|---|---|
| 5,224,203 A * | 6/1993 | Skeirik | ............ | 706/23 |
| 5,469,361 A * | 11/1995 | Moyne | ............ | 700/95 |
| 5,740,065 A | 4/1998 | Jang et al. | | |
| 6,128,588 A | 10/2000 | Chacon | | |
| 6,510,419 B1 | 1/2003 | Gatto | | |
| 6,944,616 B2 * | 9/2005 | Ferguson et al. | ............ | 1/1 |
| 6,985,779 B2 * | 1/2006 | Hsiung et al. | ............ | 700/19 |
| 7,426,502 B2 * | 9/2008 | Bronstein et al. | ............ | 706/47 |
| 2003/0083756 A1 * | 5/2003 | Hsiung et al. | ............ | 700/28 |
| 2003/0144746 A1 * | 7/2003 | Hsiung et al. | ............ | 700/28 |
| 2005/0071450 A1 | 3/2005 | Allen et al. | | |
| 2006/0184394 A1 | 8/2006 | Maughan | | |
| 2006/0259163 A1 * | 11/2006 | Hsiung et al. | ............ | 700/30 |
| 2007/0106550 A1 | 5/2007 | Umblijs et al. | | |
| 2007/0282766 A1 * | 12/2007 | Hartman et al. | ............ | 706/15 |
| 2009/0143873 A1 * | 6/2009 | Navratil et al. | ............ | 700/31 |

OTHER PUBLICATIONS

Moyne, James, "Trends in Manufacturing: Bringing the Real and Virtual Together", Brooks Software, Tuesday, Jun. 27, 2006 Copyright 2006 Brooks Software, 18 pages.
Bushman, Scott, et al., "Deploying and Leveraging Process Control Systems as Part of a Fab-wide Solution: A Tutorial", Manufacturing Automation Services/Applied Global Services AEC/APC Symposium XIX, Applied Materials, Sep. 2007, 128 pages.
O'Brian, L., "Key Industry Executives Discuss Future of Automation Business at ARC Forum", Feb. 2002, http://www.allbusiness.com/print/5904836-1-22eeq.html, 2 pages.
Everton, John G., et al., "Using Workflow Business Process Tools in Simulation Modeling", Proceedings of the 2005 Winter Simulation Conference, M.E. Kuhl, N.M. Steiger, F.B. Armstrong, J.A. Joines, eds., Dec. 2005, 5 pages.
Khan, Aftab A., et al., "An Approach for Factory-Wide Control Utilizing Virtual Metrology", IEE Transactions on Semiconductor Manufacturing, Nov. 2007, vol. 20, No. 4, 12 pages.
Wijayah, H., et al., "Reconfigurable Factory-wide Resource-based System Integration for Control", The 2006 IEEE International Electro/Information Technology Conference, May 2006, East Lansing, Michigan, USA, 6 pages.

(Continued)

*Primary Examiner* — Omar F Fernandez Rivas
(74) *Attorney, Agent, or Firm* — Blakely, Sokoloff, Taylor & Zafman LLP (57) ABSTRACT

Data of at least one of past values and present values of a system is consolidated from a plurality of sources. Virtual data of future values of the system is generated by applying the acquired data to a predictive model. Additional acquired data is received. The virtual data is dynamically updated by applying the additional acquired data to the predictive model.

22 Claims, 9 Drawing Sheets

OTHER PUBLICATIONS

PCT International Search Report and Written Opinion for International Application No. PCT/US2009/034767, mailed Aug. 3, 2009, 11 pages.

PCT International Preliminary Report on Patentability for International Application No. PCT/US2009/034767, mailed Aug. 24, 2010, 5 pages.

* cited by examiner

DYNAMICALLY UPDATED PREDICTIVE MODEL

TECHNICAL FIELD

Embodiments of the present invention relate to a user interface, and more specifically to a predictive model that is dynamically updated.

BACKGROUND

In most manufacturing environments, reactive maintenance and quality control strategies are used to fix problems as they occur. Examples of such reactive strategies include statistical process control (SPC) and advanced process control (APC). A disadvantage of reactive strategies is that they respond to problems after such problems have already occurred. Thus, product may be scrapped, machines may be taken out of commission, employee man hours may be occupied, etc. as a result of the problem.

To prevent problems before they occur, some manufacturing environments implement predictive strategies. One such predictive strategy is to simulate future values of parameters. However, the visualizations, software and/or hardware implementations, etc. of the simulation of such future values are separate and distinct from those that show past and present values of the manufacturing environment. Such simulations are therefore not integrated with information available at the factory floor, and use different data than what is available at the factory floor. If an engineer desires to see predicted future values, he must execute a first application that provides such predictions. However, if an engineer desires to see past or present values, he must execute a separate second application that provides such information. Usually, a simulation application presents data in a different manner and with different controls than those used by an application that presents past and present values.

Simulation solutions also suffer from the use of models that are static approximations of the systems that they simulate at a specified point in time. Therefore, the results that such simulations produce in problem investigation are often based on obsolete or old data. While such simulations may still be valuable, they are often not trusted, and therefore are used only as supplementary information rather than true predictors.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for generating virtual data that is predictive of future values of a system. Data of at least one of past values and present values of a system is consolidated from a plurality of sources. Virtual data of future values of the system is generated by applying the acquired data to a predictive model. Generating the virtual data may include gathering information of parameters to be predicted, and/or gathering additional information that facilitates accurate prediction of parameters. In one embodiment, a data quality indicator that indicates a degree of accuracy of the virtual data is generated using the predictive model. Additional acquired data is received. The additional acquired data may reflect real time operating conditions of a manufacturing component. The virtual data is dynamically updated by applying the additional acquired data to the predictive model.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. Unless specifically stated otherwise, as apparent from the following discussion, it is appreciated that throughout the description, discussions utilizing terms such as "displaying", "receiving", "consolidating", "generating", "updating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1A:
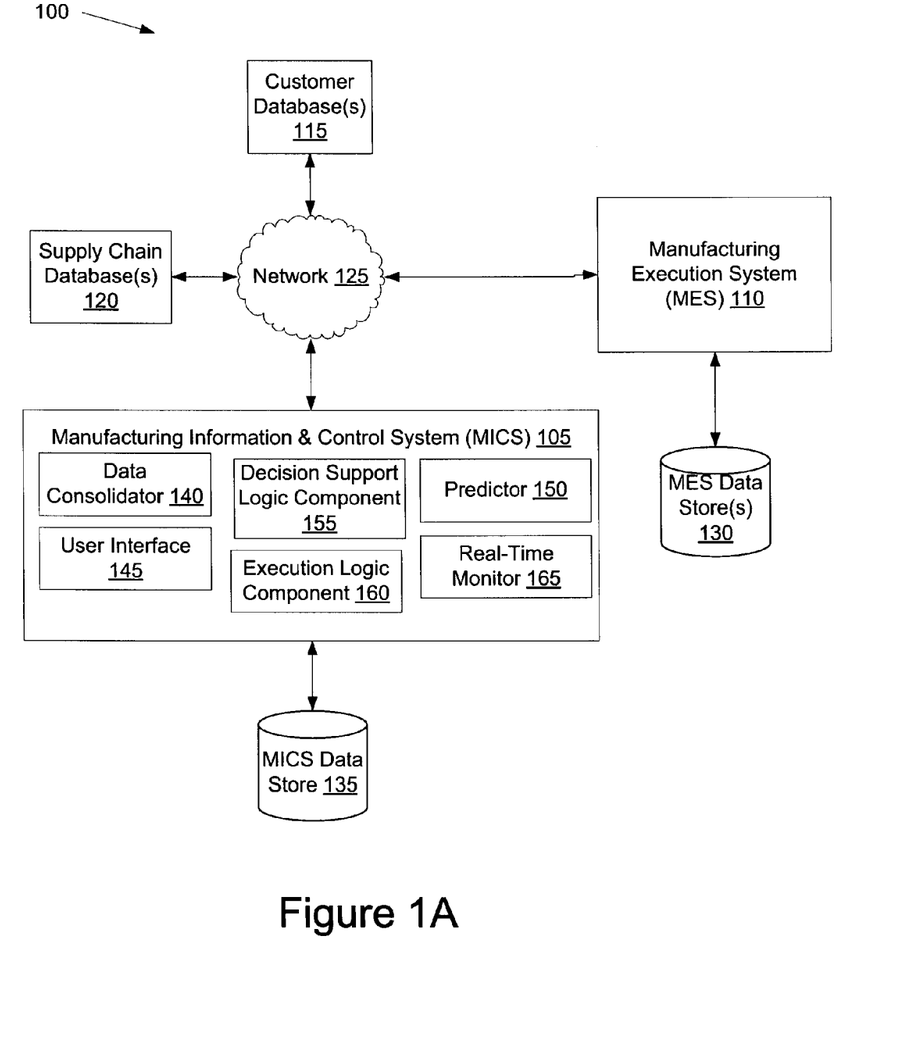
FIG. 1A illustrates an exemplary architecture of a manufacturing environment, in which embodiments of the present invention may operate.

FIG. 1A illustrates an exemplary architecture 100 of a manufacturing environment, in which embodiments of the present invention may operate. The manufacturing environment may be a semiconductor manufacturing environment, an automotive manufacturing environment, etc. In one embodiment, the architecture 100 includes one or more supply chain databases 120, one or more customer databases 115, a manufacturing execution system (MES) 110 and a manufacturing information and control system (MICS) 105, connected via a network 125.

The network 125 may be a public network (e.g., Internet), a private network (e.g., Ethernet or a local area Network (LAN)), or a combination thereof The network 125 may include multiple private networks, which may be directly connected or connected via a public network. For example, the supply chain database 120 may be connected to a first private network controlled by suppliers, the customer database 115 may be connected to a second private network controlled by a customer, and the MICS 105 and MES 110 may be connected to a third private network. Each of these private networks may be connected via a public network.

A supply chain database 120 includes information available to and/or provided by a supplier or distributor. Such information may include, for example, a supplier's orders (e.g., of parts and goods), supplier inventory (e.g., current inventory, projected inventory, etc.), projected delivery dates, etc. Where materials are acquired from multiple distributors or suppliers, architecture 100 may include multiple supply chain databases 120. For example, a first supply-chain database may include information on raw goods, and a second supply-chain database may include information on manufacturing equipment.

A customer database 115 includes information available to and/or provided by a customer. Such information may include, for example, customer demand for specified articles of manufacture, customer inventory, etc. Architecture 100 may include a single customer database 115 for multiple customers, or multiple customer databases 115, each of which provides information about a distinct customer.

The Manufacturing execution system (MES) 110 is a system that can be used to measure and control production activities in a manufacturing environment. The MES 110 may control some production activities (e.g., critical production activities) or all production activities of a set of manufacturing equipment (e.g., all photolithography equipment in a semiconductor fabrication facility), of a manufacturing facility (e.g., an automobile production plant), of an entire company, etc. The MES 110 may include manual and computerized off-line and/or on-line transaction processing systems. Such systems may include manufacturing machines, metrology devices, client computing devices, server computing devices, databases, etc. that may perform functions such as processing, equipment tracking, dispatching (e.g., determining what material goes to what processes), product genealogy, labor tracking (e.g., personnel scheduling), inventory management, costing, electronic signature capture, defect and resolution monitoring, key performance indicator monitoring and alarming, maintenance scheduling and so on.

In one embodiment the MES 110 is connected with one or more MES data stores 130. The MES data stores 130 may be databases, file systems, or other arrangements of data on nonvolatile memory (e.g., hard disk drives, tape drives, optical drives, etc.), volatile memory (e.g., random access memory (RAM)), or combination thereof. Each MES data store 130 may store, for example, historical process information of manufacturing recipes (e.g., temperatures, pressures, chemicals used, process times, etc.), equipment maintenance histories, inventories, etc.

The manufacturing information and control system (MICS) 105 combines disparate information from multiple different sources (e.g., data stores), and presents this information in a single interface. The MICS 105 can be used to gain an understanding of the manufacturing environment, and can enable a user to determine an efficiency of the manufacturing environment and/or how to improve all or components of the manufacturing environment. The MICS 105 may also draw inferences from, report out, and/or act upon the combined information. For example, MICS 105 can act as an early warning system (e.g., predict scrap, initiate product rework, etc.), provide bottleneck analysis, provide asset management (e.g., reduce unscheduled equipment downtime), improve lean practices, etc. In one embodiment, MICS 105 includes a data consolidator 140, a user interface 145, a decision support module 155, an execution module 160, a predictor 150, and a real-time monitor 165.

The data consolidator 140 consolidates acquired data of past parameter values and/or present parameter values from multiple different sources (e.g., data stores), and presents the acquired data as if it-originated from a single data source. The manner in which the acquired data from the data sources is consolidated may be dependant upon relationships between the acquired data. Such relationships may be user defined. Moreover, sources from which data is consolidated, and the manner in which data is consolidated, can be user configurable. Therefore, as new data stores are added and/or old data stores are removed, data consolidator 140 may be adapted to accommodate the change.

In one embodiment, data consolidator 140 consolidates data from multiple MES data stores 130 (e.g., an inventory data store, a maintenance data store, a metrology data store, process data stores, etc.). In a further embodiment, the data consolidator 140 consolidates data from the supply chain databases 120 and/or customer databases 115. In yet a further embodiment, data consolidator 140 consolidates real-time data as the data is collected by real-time monitor 165 (e.g., from manufacturing machines and metrology machines). In still a further embodiment, data consolidator 140 consolidates virtual data that has been generated by predictor 150. Data consolidator 140 can also consolidate manually entered data (e.g., data entered by a device operator, maintenance personnel, etc.).

In one embodiment, data consolidator 140 stores consolidated acquired data in MICS data store 135. Alternatively, data consolidator 140 may store a subset of all consolidated acquired data in MICS data store 135. For example, data consolidator 140 may store consolidated data necessary to generate virtual data in MICS data store 135.

Real-time monitor 165 collects real-time data of present values of one or more parameters. Such real-time data may be collected from sensors and systems to which MICS 105 is connected via network 125. Real-time monitor 165 may, for example, collect data from manufacturing equipment and metrology equipment as the data is generated. In one embodiment, real time monitor 165 provides the real-time data to data consolidator 140.

Predictor 150 uses the consolidated acquired data of past parameter values and/or present parameter values (e.g., of one or more elements of the manufacturing execution system 110) to generate virtual data that predicts future values of the parameters. Predictor 115 may then store the generated virtual data in MICS data store 135. Virtual data may be generated and stored without impacting the historical data stores of the acquired data. Virtual data may be generated based on trend extrapolation, interpolation, simulation (e.g., model-based simulation), etc.

The methods, models and/or algorithms used to generate virtual data may depend on the parameter being predicted. For example, a first simulation model may be used to predict future values of a first parameter, and a second simulation model may be used to predict future values of a second parameter.

In one embodiment, predicting future values of a particular parameter requires access to past values of the parameter. Access to past values of associated parameters that influence the parameter that is to be predicted may also be necessary. For example, predicting a buffer length parameter value for a specific manufacturing device may include collecting parameter values of lots received, lots dispatched, scheduled maintenance for similar manufacturing devices, health statistics for similar manufacturing devices, etc.

Predicting future values of a particular parameter may also include predicting the future values of associated parameters. For example, to accurately predict a pressure of a device, a model may first need to predict a future power and gas flow rate of the device. Associated future predictions are referred to herein as virtual extensions. The virtual extension can have a one to many relationship with nonvirtual components (acquired data), and these non-virtual components can each be associated with one or more virtual component, which means that virtual extensions can be applied to more than one data parameter. Therefore, a single virtual extension (or set of virtual extensions) may be used for predictions of multiple different parameters. A single virtual extension may also be associated with multiple predicted values of a single virtual data parameter. Applying a virtual extension to multiple predicted values can minimize consumption of data storage.

In one embodiment, predictor 150 generates data quality indicators, and associates the data quality indicators with the virtual data. A data quality indicator can be implemented as a specialized type of virtual extension that has no present or past counterpart. Data quality indicators indicate a degree of accuracy of the virtual data. Data quality indicators may include, for example, error bars, standard deviation, variance, mean, etc. These data quality indicators allow the user to understand the confidence of the prediction and make use of the prediction in a quantitative manner.

The further into the future a prediction is extended, the lower the degree of accuracy of the virtual data. Therefore, the data quality generally degrades with time, and this is conveyed with the data quality indicators. As with other virtual extensions, data quality indicators may be associated with multiple parameters. As an example, if a data qualifier includes upper and lower bounds, and these bounds are valid for a number of data points over a period of time, the scheme allows all of these data points to be tied to a single upper and lower bounds set.

Figure 1B:
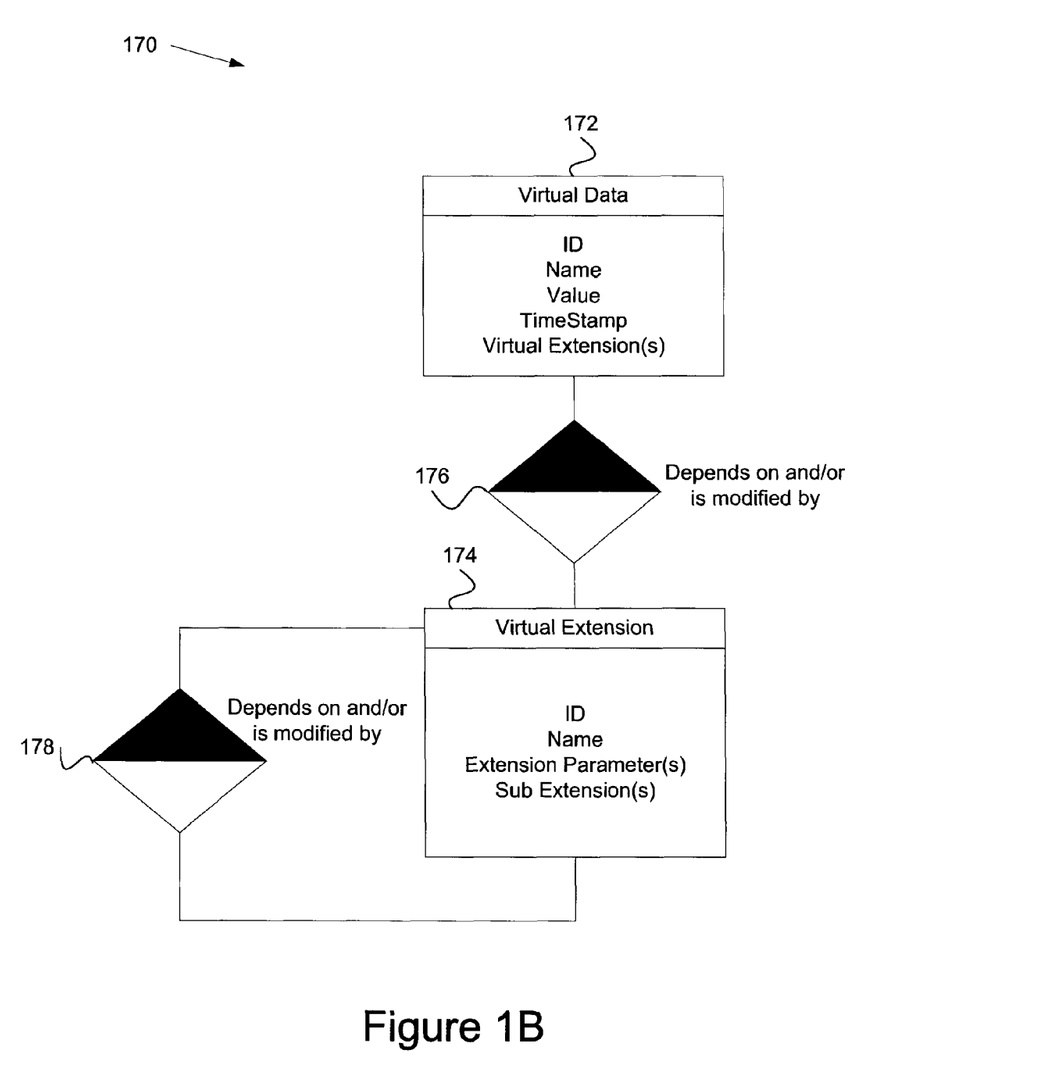
FIG. 1B illustrates an entity relationship diagram of a database schema, in accordance with one embodiment of the present invention.

FIG. 1B illustrates an entity relationship diagram of a database schema 170, in accordance with one embodiment of the present invention. The database schema 170 can optimize utilization of database space, and support potentially complex relationships in virtual extensions. Database schema 170 includes a virtual data set 172 that shares a relationship with a virtual extension set 174 via a first relationship set 176. Each virtual data parameter of the virtual data set 172 may include a unique identifier (ID), a descriptor (name), a value (e.g., 10 degrees), a timestamp, and/or one or more virtual extensions. In one embodiment, the unique identifier entry is a primary key of the virtual data set 172, and the virtual extension entry is a foreign key of the virtual data set 172. As the foreign key of the virtual data set 172, the virtual extension entry can link a virtual data parameter to a distinct member of the virtual extension set 174. Each virtual extension of the virtual extension set 174 may include a unique identifier (ID), a descriptor (name), one or more extension parameters, and/or one or more sub extensions. In one embodiment, the unique identifier entry is a primary key of the virtual extension set 174, and the sub extension entry is a foreign key of the virtual extension set 174. As the foreign key of the virtual extension set 174, the sub extension entry can link a virtual extension to another distinct member of the virtual extension set 174.

The first relationship set 176 shows that multiple virtual data parameters of the virtual data set 172 can share a relationship with a single virtual extension of the virtual extension set 174. The relationships characterized by first relationship set 176 are such that the virtual data set 172 can be dependent on and/or modified by virtual extension set 174. The database schema 170 also includes a second relationship set 178 showing that multiple virtual extensions of the virtual extension set 174 may share a relationship with another virtual extension of the virtual extension set 174. The relationships characterized by second relationship set 178 are such that the virtual extension set 174 can be dependent on and/or modified by virtual extension set 174. This allows a recursive relationship between virtual extensions.

In an example, if a parameter such as temperature is being predicted with a prediction granularity of one second with a time horizon of one minute, then 60 predicted virtual data parameter values would be stored in a virtual database. If a confidence indicator is calculated with each prediction, then 60 confidence indicators would also be stored. If 3-sigma upper and lower bounds are only calculated every tenth data point, then 6 each of upper and lower bounds (rather than 60 each) would be stored, with each of these extensions being linked to 10 predicted values via foreign keys. If a single absolute upper bound is calculated every minute based on the 3-sigma upper bounds, then a single value of absolute upper bound would be linked to the 6 3-sigma upper bounds (and thus are linked to all 60 predicted values). This extension approach also allows for easier reconfigurability of prediction capabilities and the subsequent update of prediction extension information.

Returning to FIG. 1A, data consolidator 140 may consolidate the virtual data with the consolidated acquired data. Virtual data and acquired data may be consolidated such that the virtual data is aligned with associated acquired data. Thus, for example, if the acquired data represents a database field of machine buffer length, and this value is being predicted, the virtual data would represent predicted machine buffer length. As explained with reference to FIG. 1B, in extending a data field into the future, additional qualifier parameters can be tied to the data field to provide a more complete description of the predicted data (e.g., data quality indicators, virtual extensions, etc.). Specifically, at minimum an indication of prediction quality (data quality indicator) can be tied to the predicted data.

In one embodiment, data consolidator 140 continuously consolidates new acquired data with existing consolidated real and virtual data. The new acquired data may be real-time data received from real-time monitor 165 and/or additional data added to MES data stores 130, supply chain databases 120, customer databases 115, etc. The new acquired data may replace portions of virtual data (e.g., where a timestamp for the new acquired data matches a timestamp of the virtual data). For example, once a predicted event occurs, a predicted value for the event may be replaced by a real value.

In one embodiment, predictor 150 continuously updates the virtual data using a dynamic prediction model. As new data is gathered and consolidated by data consolidator 140, the new data can be used to recalculate the virtual data using the designated prediction techniques (e.g., models). Therefore, the virtual data may always be based on the most current data, increasing prediction accuracy. Each recalculation can provide a more accurate prediction of future values. In one embodiment, recalculating the virtual data includes recalculating data quality indicators associated with the virtual data. In one embodiment, recalculating virtual data includes replacing the original virtual data. Alternatively, the original virtual data may not be overwritten.

User interface 145 provides interactive displays of the consolidated acquired data and virtual data. Through these displays, a user can view past, present, and future values of the manufacturing environment. In one embodiment, user interface 145 provides flexible visualization capabilities such as customizable plots, overlays, summary data, key performance indicators, and drill downs to individual data point values. In another embodiment, user interface 145 provides animated visualizations of information so that dynamic properties of the information can be viewed in a condensed time format. User interface 145 may access and present virtual data and acquired data in the same manner, thus providing an intuitive access to predicted data alongside historical data. The data quality indicator may provide additional information on quality of predicted virtual data, superimposed on a visualization of the virtual data. Embodiments of the user interface 145 are described in greater detail below in reference to FIGS. 2A-4B.

Referring to FIG. 1A, decision support logic component 155 provides recommendations and decisions based on the historical and current operational status (e.g., acquired data of past and present values). Decision support logic component 155 may also provide recommendations and decisions based on future operational status (e.g., virtual data of future values). The decision support logic component 155 may provide such recommendations and decisions based on business logic that matches a set of values with an outcome. The outcome may, for example, cause maintenance personnel to be notified of a pending machine failure, cause a process engineer to be notified of abnormal measurement results, etc. The outcome may also recommend actions to be taken. For example, the outcome may recommend that particular maintenance be performed on a machine.

Execution logic component 160 is responsible for taking action on the business systems based on the output of the decision support logic component 155. These actions are in the form of intelligent business rules that can be launched either through real-time system events, predicted events, or scheduled activities. For example, execution logic 160 may automatically schedule maintenance for a machine when certain values are detected, automatically shut down the machine, etc.

Though the exemplary architecture 100 described above is of a manufacturing environment, embodiments of the present invention may also operate in other environments such as an investment environment (e.g., for trading stocks, bonds, currencies, etc.), a research environment, etc. In such alternative environments, no manufacturing execution system may be present, and the manufacturing information and control system may instead be a research information and control system, investment information and control system, etc. However, the functionality of the data consolidator 140, user interface 145, decision support logic component 155, execution logic component 160, predictor 150 and real-time monitor 165 may remain unchanged regardless of the environment.

FIGS. 2A-4B illustrate exemplary views of a user interface through which a user can monitor, control, and predict system operations, in accordance with embodiments of the present invention. The exemplary views of the user interface may display acquired data of past values and present values of parameters. The exemplary views of the user interface may also display virtual data of future values of the parameters. Some or all of the exemplary views of the user interface may present the acquired data and virtual data with a unified visual appearance such that the relationship between the past values, present values, and predicted future values is visually indicated. In one embodiment, the user interface corresponds to user interface 145 of FIG. 1A.

Figure 2A:
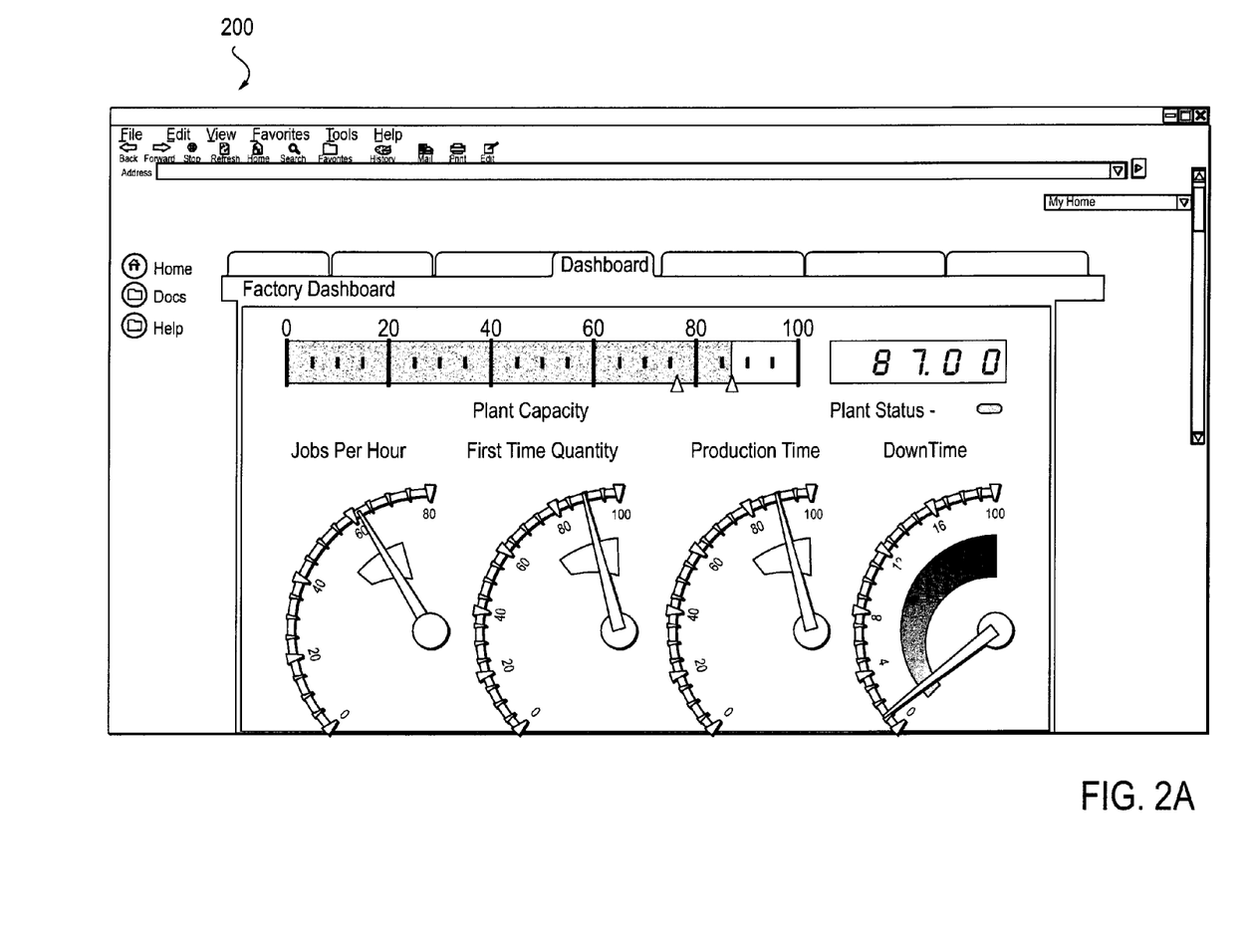
FIG. 2A illustrates a first view of a user interface, in accordance with one embodiment of the present invention.

Referring to FIG. 2A, a first view 200 of the user interface illustrates a dashboard view of exemplary key performance indicators for a manufacturing facility (plant) at a specified point in time, in accordance with one embodiment of the present invention. The key performance indicators include plant capacity, plant status, jobs per hour, first time quality, production time, downtime, etc. Each of the key performance indicators is displayed with an associated value. For example, the plant capacity is shown to be 87 percent, and the jobs per hour is shown to be approximately 60. The specified point in time may be adjusted, such that past key performance indicator values are shown, present key performance indicator values are shown, or future key performance indicator values are shown. If future key performance indicator values are shown, data quality indicators may be shown in association with the values.

In another embodiment, the key performance indicator visualization may be animated to dynamically display the evolution of indicator values from the past through the present into the future in a compressed time format. For example, the animation may equate one second of display time to one hour of factory time. The indicators may be animated to illustrate data from one week in the past, through the present, to one week in the future (in an approximately 6 minute animation). As the animation crosses the present time boundary (referred to as NOWTIME here) into the prediction space, the visualization may choose to also display data quality indicators along with the predicted values e.g., by superimposing these values on the animation for all time values greater than NOW-TIME.

The key performance indicators may be user defined, and may depend on a system with which they are associated. For example, an alternative dashboard view of key performance indicators of a particular department within a manufacturing facility may be shown. Key performance indicators included in such an alternative dashboard view may include statuses of particular categories of machines, throughput, downtime, etc.

Figure 2B:
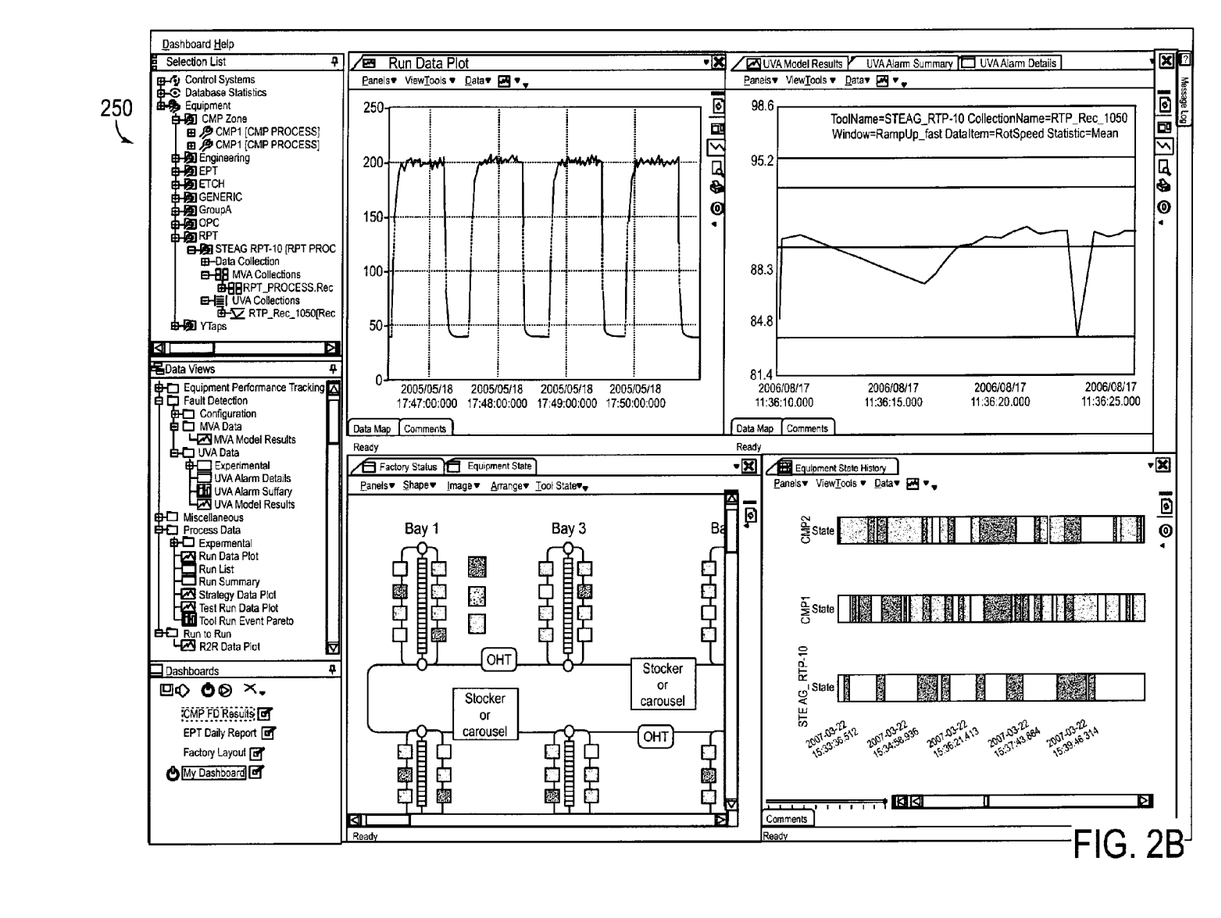
FIG. 2B illustrates a second view of the user interface, in accordance with another embodiment of the present invention.

FIG. 2B illustrates a second view 250 of the user interface, in accordance with one embodiment of the present invention. In the second view 250, multiple exemplary tiled windows show different real and/or virtual data. As shown, a first window displays a run data plot, a second window displays univariate analysis (UVA) model results, a third window shows a factory status, and a fourth window displays an equipment state history. More or fewer windows may be shown. Data to be displayed in windows can be selected from a data selection list, and visualizations to use to display the data may be selected from a data views list. Examples of visualization options include graphing the data, providing a data overlay, providing an animation of the data, etc. Some or all of the windows may provide simultaneous representation and visualization of acquired data and virtual data. Any of the windows may be individually advanced forward or stepped backward in time to view past values, present values or predicted future values. Alternatively, all windows may be advanced forward or stepped backward in time together.

Figure 3:
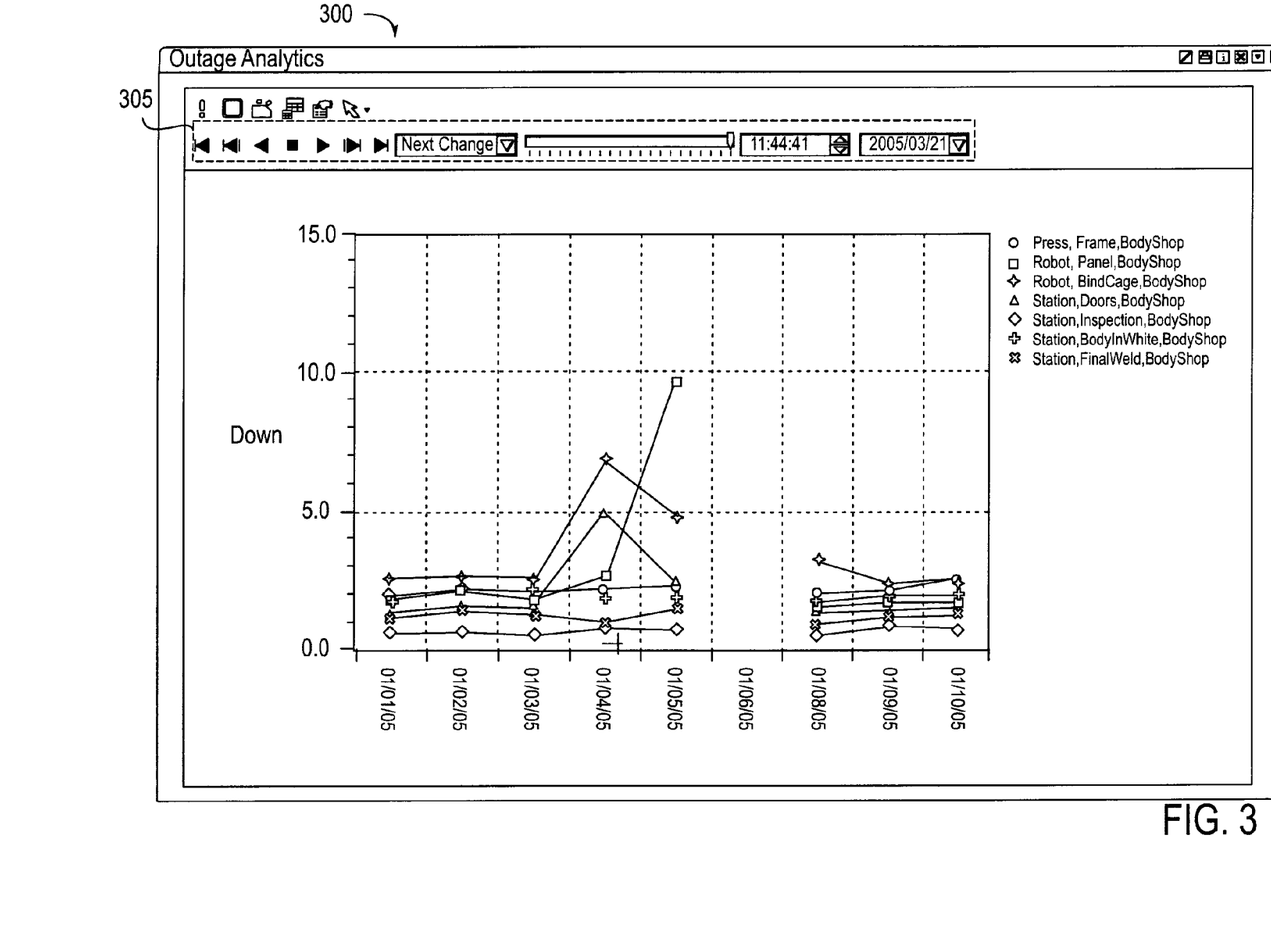
FIG. 3 illustrates a third view of the user interface, in accordance with yet another embodiment of the present invention.

FIG. 3 illustrates a third view 300 of the user interface, in accordance with one embodiment of the present invention. The third view 300 may be included as a distinct window in the second view 250. Alternatively, the third view 300 may be separate and distinct from second view 250.

Third view 300 includes a timeline perspective of a collection of specified parameters. The exemplary specified parameters shown include outage analytics for manufacturing equipment. However, a timeline perspective of any specified parameter or parameters may be shown. The timeline perspective can show past values, present values, and future predicted values in a visually unified manner. For example, data points shown at the dates Jan. 1, 2005 and Jan. 2, 2005 may represent past values of acquired data, data points shown at the date Jan. 3, 2005 may represent present values of acquired data, and data points shown at the dates Jan. 4, 2005-Jan. 10, 205 may represent future values of virtual data.

Third view 300 may include multiple playback controls 305 that advance the timeline perspective forward in time and backward in time. Playback controls 305 may, for example, include stop, play forward, play backward, skip forward, skip backward, etc. controls. Playback controls 305 may be used to animate data shown in the third view 300. Alternatively, the data may be shown in a static format.

Figure 4A:
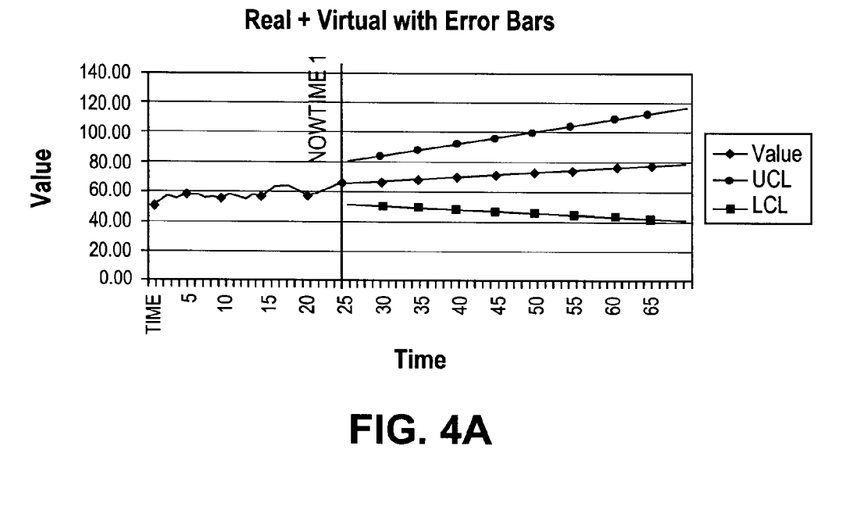
FIG. 4A illustrates a fourth view of the user interface, in accordance with still another embodiment of the present invention.

FIG. 4A illustrates a fourth view 400 of the user interface, in accordance with one embodiment of the present invention. Fourth view 400 includes a timeline perspective of a specified parameter. In the fourth view 400, past values of the parameter are shown for times 0-24. A present value of the parameter is shown at time 25. Future values for the parameter are shown from time 26 and on. A vertical bar labeled NOWTIME_1 indicates the present time. As shown, the visualization of the parameter in moving from historical data, through NOWTIME_1, into the virtual data is seamless (e.g., the visualization of the parameter value is unchanged).

A data quality indicator is associated with the future values of the parameter. The data quality indicator represents a confidence level for the predicted future values of the parameter. In the exemplary fourth view 400, the data quality indicator includes an upper control limit and a lower control limit. The upper control limit may represent a maximum possible predicted value for the parameter, and the lower control limit may represent a minimum possible predicted value for the parameter at a given time. The further into the future a value for the parameter is predicted, the lower the confidence level of the prediction. For example, the upper control limit for the parameter at time 70 is shown to be approximately 120, while the upper control limit at time 26 is shown to be approximately 80. Likewise, the lower control limit for the parameter at time 70 is shown to be approximately 40, while the lower control limit at time 26 is shown to be approximately 50.

Figure 4B:
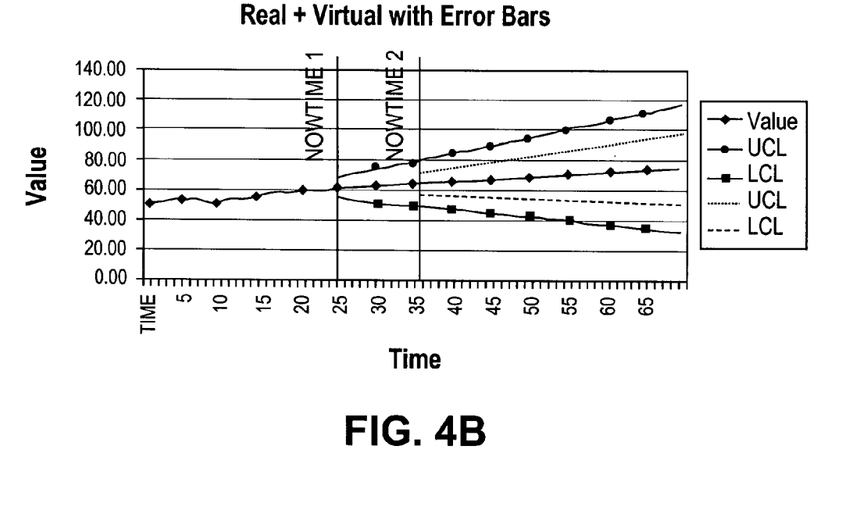
FIG. 4B illustrates a fifth view of the user interface, in accordance with still yet another embodiment of the present invention.

FIG. 4B illustrates a fifth view 450 of the user interface, in accordance with another embodiment of the present invention. The fifth view 450 corresponds to the fourth view 400 shown in FIG. 4B after time has advanced such that present time is at 36. In the fifth view 450, past values of the parameter are shown for times 0-35. A present value of the parameter is shown at time 36. Future values for the parameter are shown from time 37 and on. A vertical bar labeled NOWTIME_2 indicates the present time.

As shown, the data quality indicator is recalculated at NOWTIME_2. Therefore, different upper control limits and lower control limits are shown for the parameter at NOWTIME_2 than were shown at NOWTIME_1. The tighter control limits shown at NOWTIME_2 reflect the fact that the data quality indicators have been recalculated using additional data that was gathered after NOWTIME_1. In one embodiment, the data quality indicators are continuously recalculated as data is gathered. Alternatively, data quality indicators may be recalculated periodically at specified time intervals (e.g., every 5 seconds, every 10 minutes, every day, etc.).

Figure 5:
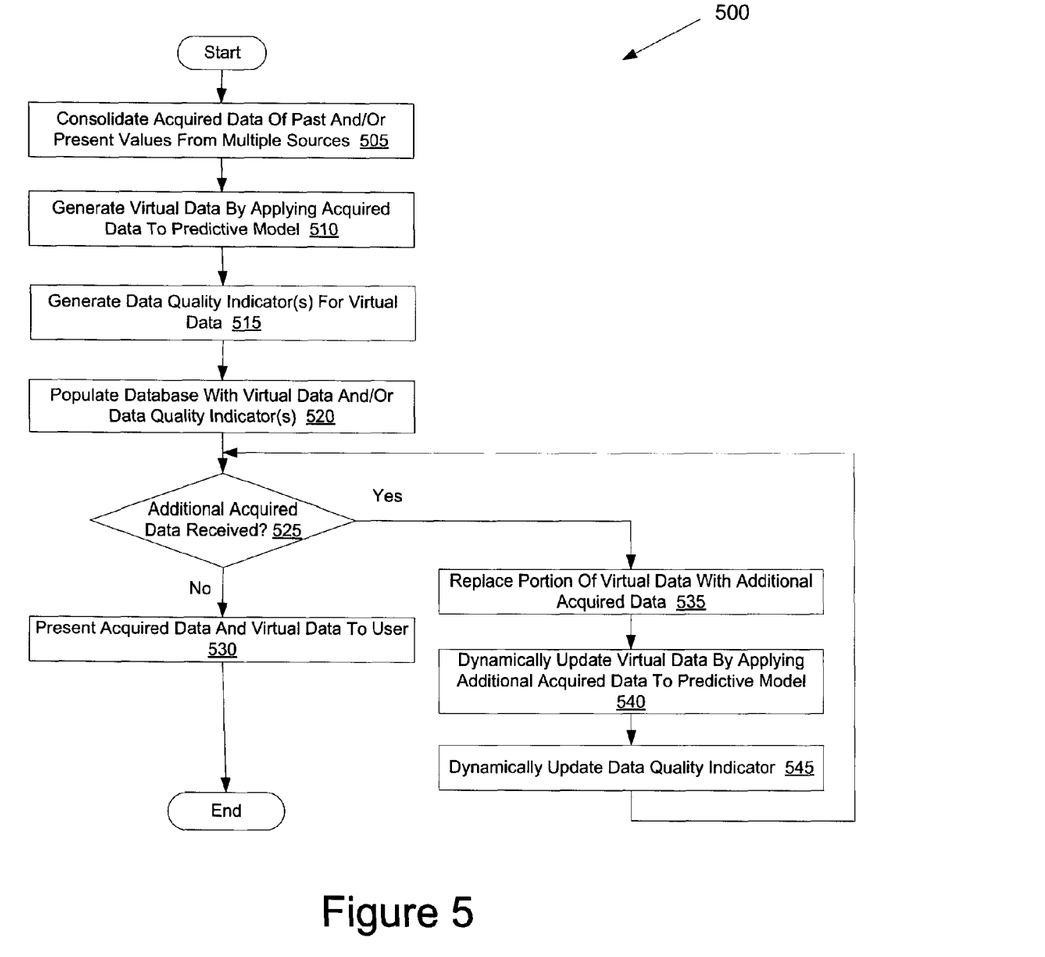
FIG. 5 illustrates a flow diagram of one embodiment for a method of dynamically generating virtual data.

FIG. 5 illustrates a flow diagram of one embodiment for a method 500 of generating virtual data. The method may be performed by processing logic that may comprise hardware (e.g., circuitry, dedicated logic, programmable logic, microcode, etc.), software (such as instructions run on a processing device), or a combination thereof. In one embodiment, method 500 is performed by manufacturing information and control system 105 of FIG. 1A.

Referring to FIG. 5, method 500 includes consolidating the acquired data of past and present parameter values from multiple sources (block 505). The multiple sources may include customer databases, supply chain databases, MES data stores, and/or additional data stores. In one embodiment the acquired data is consolidated by data consolidator 140 of FIG. 1A.

At block 510, virtual data is generated by applying acquired data to a predictive model. The predictive model may be a simulation, extrapolation, interpolation, or other type of predictive model. The virtual data may represent predicted future values of the same parameters represented by the acquired data. In one embodiment, generating the virtual data includes generating virtual extensions that represent additional parameters that are associated with the predicted parameter or parameters. In one embodiment, the virtual data is generated by predictor 150 of FIG. 1A.

A block 515, data quality indicators are generated for the virtual data. The data quality indicators may include, for example, error bars (e.g., upper control limits and lower control limits), standard deviations, variance, etc. In one embodiment, the data quality indicators are generated by predictor 150 of FIG. 1A.

At block 520, a database is populated with virtual data and/or the data quality indicators. The database may be, for example, a manufacturing information and control system data store. Alternatively, the database may be a distinct database designated for virtual data, data quality indicators, and/or virtual extensions. Once the database has been populated, the virtual data can be consolidated with the acquired data. In one embodiment, this occurs automatically as virtual data is generated.

At block 525, processing logic determines whether additional acquired data has been received. Additional acquired data may be received, for example, from a real-time monitor (e.g., real time monitor 165 of FIG. 1A), or from one of multiple data stores and/or databases from which processing logic collects acquired data. If additional acquired data has been received, the method continues to block 535. If no additional acquired data has been received, the method proceeds to block 530.

At block 535, a portion of the virtual data is replaced with the additional acquired data. In one embodiment, all data is associated with a specific time period. The time period may be a historic point in time at which the data was collected, or a projected future point in time. The point in time may be represented by a timestamp. In one embodiment, the portion of the virtual data that is replaced is replaced by acquired data having a same timestamp as the virtual data.

At block 540, the virtual data is dynamically updated by applying the additional data to the predictive model. In one embodiment, the virtual data is continuously updated as additional data is received. Alternatively, the virtual data may be updated on a periodic basis. At block 545, the data quality indicators are dynamically updated.

At block 530, the acquired data and virtual data are presented to a user via a user interface. In one embodiment, the user interface corresponds to the user interface shown in FIGS. 2A-4B. The method then ends.

Figure 6:
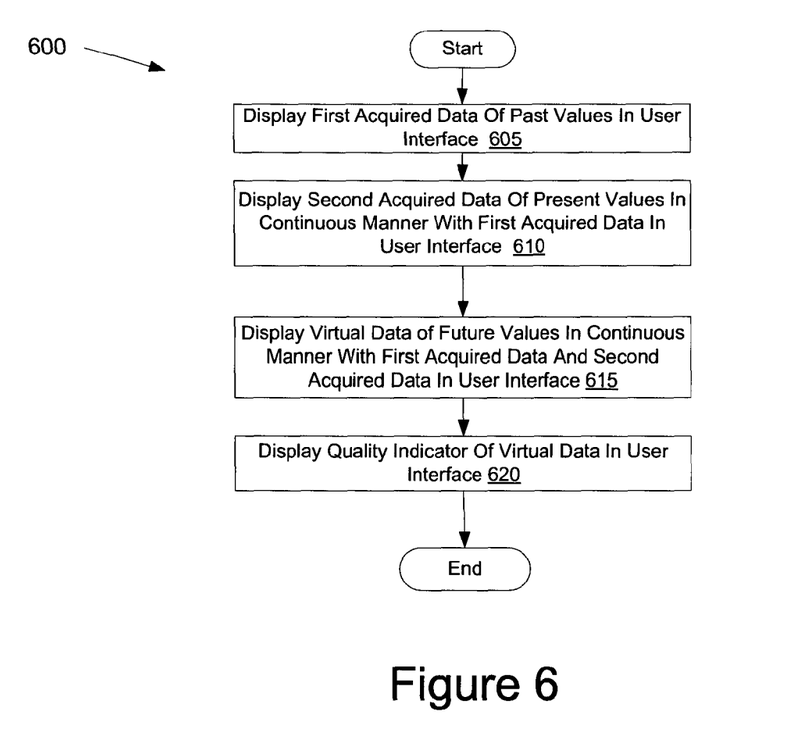
FIG. 6 illustrates a flow diagram of one embodiment for a method of displaying acquired data and virtual data in a user interface.

FIG. 6 illustrates a flow diagram of one embodiment for a method 600 of displaying acquired data and virtual data in a user interface. The method may be performed by processing logic that may comprise hardware (e.g., circuitry, dedicated logic, programmable logic, microcode, etc.), software (such as instructions run on a processing device), or a combination thereof. In one embodiment, method 600 is performed by manufacturing information and control system 105 of FIG. 1A.

Referring to FIG. 6, method 600 includes displaying first acquired data of past values of one or more parameters in a user interface (block 605). The user interface may enable a user to monitor, control, and predict system operations. In one embodiment, the parameters represent key performance indicators that can be shown in a dashboard view of the user interface. At block 610, second acquired data of present values of the one or more parameters are displayed in the user interface. The second acquired data may be presented in a continuous manner with the first acquired data.

At block 615, virtual data of future values of the one or more parameters are displayed in the user interface. The virtual data can be displayed in a continuous manner with the first rule data and the second acquired data. In one embodiment, the first acquired data, the second acquired data, and the virtual data are presented with a unified visual appearance such that a relationship between the past values, present values, and future values is visually indicated. In a further embodiment, the user interface includes at least one of a graph, overlay, animation, or report that provides simultaneous representation and visualization of the first acquired data, the second acquired data and the virtual data. In another embodiment, the first acquired data, second acquired data, and virtual data are presented in a timeline perspective.

At block 620, a data quality indicator of the virtual data is displayed in the user interface. The data quality indicator may represent a degree of accuracy of the virtual data. In one embodiment, the data quality indicator varies as a function of time.

Figure 7:
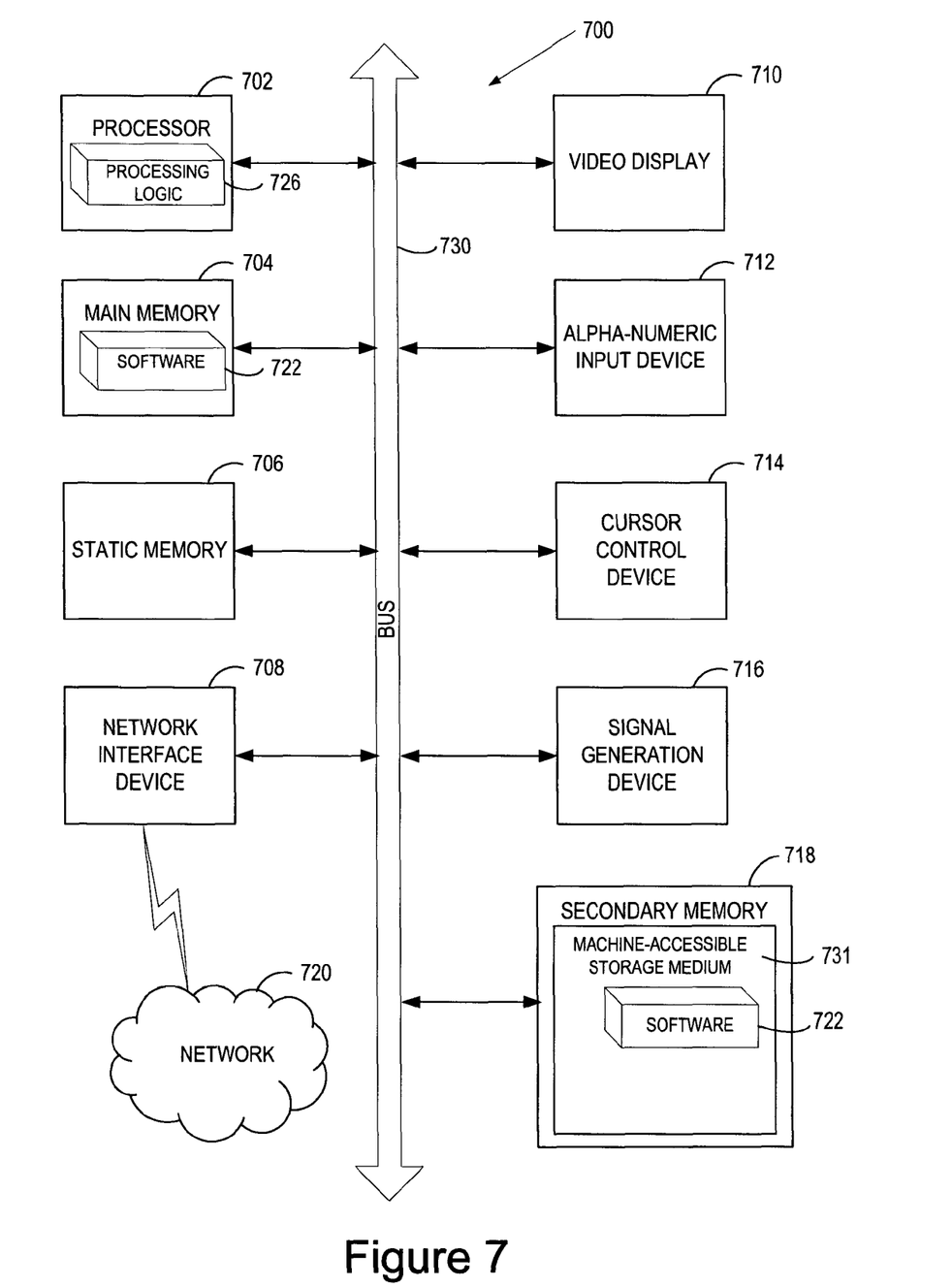
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-readable storage medium (or more specifically a computer-readable storage medium) 731 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-readable storage media. The software 722 may further be transmitted or received over a network 720 via the network interface device 708.

The machine-readable storage medium 731 may also be used to store a data consolidator, predictor and/or user interface 145 (e.g., the data consolidator 140, predictor 150 and user interface 145 of FIG. 1A), and/or a software library containing methods that call a data consolidator, predictor and/or user interface. The machine-readable storage medium 731 may further be used to store one or more additional components of a manufacturing information and control system (MICS), such as a decision support logic component, a real-time monitor, and/or an execution logic component. While the machine-readable storage medium 731 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer implemented method, comprising:
   consolidating acquired data of at least one of past values and present values of a system from a plurality of sources;
   generating virtual data of future values of the system by applying the acquired data to a predictive model;
   receiving additional acquired data; and
   dynamically updating the virtual data by applying the additional acquired data to the predictive model, wherein the additional acquired data replaces a portion of the generated virtual data, the additional acquired data including a first time stamp that matches a second time stamp of the replaced portion of the generated virtual data.

2. The method of claim 1, wherein the additional acquired data reflects real time operating values of a manufacturing component, and wherein the virtual data is dynamically updated as the real time operating values of the manufacturing component change.

3. The method of claim 1, wherein generating virtual data of future values includes gathering information of parameters to be predicted, and gathering additional information that facilitate accurate prediction of the parameters.

4. The method of claim 1, further comprising:
   generating a data quality indicator that indicates a degree of accuracy of the virtual data by applying the acquired data to the predictive model; and
   dynamically updating the data quality indicator in accordance with the additional acquired data.

5. The method of claim 1, wherein the plurality of sources include at least one component of a manufacturing execution system and at least one component of a manufacturing information system, and wherein the predictive model includes at least one of a simulation, extrapolation or interpolation for a parameter that is measured and controlled by the at least one component of the manufacturing execution system or the at least one component of the manufacturing information system.

6. The method of claim 1, further comprising:
   storing the virtual data; and
   combining the acquired data with the virtual data such that monitoring and diagnostics tools can access, act on, and present the virtual data in a same manner as the monitoring and diagnostics tools access, act on, and present the acquired data.

7. The method of claim 6, wherein the virtual data and acquired data is accessible to the monitoring and diagnostics tools in such a way that those tools can present the virtual data and acquired data in an animated format with seamless transition between past, present and future.

8. The method of claim 1, further comprising:
   generating a virtual extension to the virtual data;
   storing the virtual extension and the virtual data in a database; and
   mapping the virtual extension to multiple values of the virtual data to reduce an amount of space occupied by the virtual extension, and to maximize reconfigurability of the virtual extension.

9. The method of claim 1, wherein the virtual data includes a virtual alarm, the virtual alarm indicating that an alarm condition is predicted to occur in the future.

10. A computing apparatus, comprising:
    one or more data stores to store acquired data of at least one of past values and present values of a system;
    a data consolidator, connected with the one or more data stores, to consolidate the acquired data from the one or more data stores; and
    a predictor, connected with the data consolidator, to generate virtual data of future values of the system by applying the consolidated acquired data to a predictive model, and to dynamically update the virtual data as new acquired data becomes available, wherein the new acquired data replaces a portion of the generated virtual data, the new acquired data including a first time stamp that matches a second time stamp of the replaced portion of the generated virtual data.

11. The computing apparatus of claim 10, wherein the new acquired data reflects real time operating values of a manufacturing component, and wherein the virtual data is dynamically updated as the real time operating values of the manufacturing component change.

12. The computing apparatus of claim 10, wherein the predictor generates a data quality indicator that indicates a degree of accuracy of the virtual data by applying the acquired data to the predictive model, and dynamically updates the data quality indicator as the new acquired data becomes available.

13. The computing apparatus of claim 10, further comprising:
    an additional data store, connected with the data consolidator and with the predictor, to populate with the virtual data generated by the predictor; and
    the data consolidator to combine the acquired data with the virtual data such that monitoring and diagnostics tools can access, act on, and present the virtual data in a same manner as the monitoring and diagnostics tools access, act on, and present the acquired data.

14. The computing apparatus of claim 13, further comprising:
the predictor configured to generate a virtual extension to the virtual data, and to map the virtual extension to multiple values of the virtual data to reduce an amount of space occupied by the virtual extension, and to maximize reconfigurability of the virtual extension; and
the additional data store to store the virtual extension.

15. The computing apparatus of claim 10, further comprising:
a decision support module, connected with the consolidator and the predictor, to detect a virtual alarm indicating that an alarm condition is predicted to occur in the future; and
an execution module to perform an action in response to the virtual alarm.

16. A non-transitory computer readable medium including instructions that, when executed by a processing system, cause the processing system to perform a method, comprising:
consolidating acquired data of at least one of past values and present values of a system from a plurality of sources;
generating virtual data of future values of the system by applying the acquired data to a predictive model;
receiving additional acquired data; and
dynamically updating the virtual data by applying the additional acquired data to the predictive model, wherein the additional acquired data replaces a portion of the generated virtual data, the additional acquired data including a first time stamp that matches a second time stamp of the replaced portion of the generated virtual data.

17. The non-transitory computer readable medium of claim 16, wherein the additional acquired data reflects real time operating values of a manufacturing component, and wherein the virtual data is dynamically updated as the real time operating values of the manufacturing component change.

18. The non-transitory computer readable medium of claim 16, wherein generating virtual data of future values includes gathering information of parameters to be predicted, and gathering additional information that facilitate accurate prediction of the parameters.

19. The non-transitory computer readable medium of claim 16, the method further comprising:
generating a data quality indicator that indicates a degree of accuracy of the virtual data by applying the acquired data to the predictive model; and
dynamically updating the data quality indicator in accordance with the additional acquired data.

20. The non-transitory computer readable medium of claim 16, wherein the plurality of sources include at least one component of a manufacturing execution system and at least one component of a manufacturing information system, and wherein the predictive model includes at least one of a simulation, extrapolation or interpolation for a parameter that is measured and controlled by the at least one component of the manufacturing execution system or the at least one component of the manufacturing information system.

21. The non-transitory computer readable medium of claim 16, the method further comprising:
storing the virtual data; and
combining the acquired data with the virtual data such that monitoring and diagnostics tools can access, act on, and present the virtual data in a same manner as the monitoring and diagnostics tools access, act on, and present the acquired data.

22. The non-transitory computer readable medium of claim 21, wherein the virtual data and acquired data is accessible to the monitoring and diagnostics tools in such a way that those tools can present the virtual data and acquired data in an animated format with seamless transition between past, present and future.

* * * * *